United States Patent
Lai

(10) Patent No.: US 6,323,841 B1
(45) Date of Patent: Nov. 27, 2001

(54) COMPUTER MOUSE HAVING A RESILIENT SOFT PAD WITH MASSAGING FUNCTION

(76) Inventor: Sun-Long Lai, 2nd Floor, No. 47, Chung Hua Road, Sec. 1, Taipei City (TW)

( * ) Notice: Subject to any disclaimer, the term of this patent is extended or adjusted under 35 U.S.C. 154(b) by 0 days.

(21) Appl. No.: 09/385,648

(22) Filed: Aug. 27, 1999

(51) Int. Cl.[7] .................................................. G09G 5/08
(52) U.S. Cl. ........................................... 345/163; D14/402
(58) Field of Search ................................................ 345/163

(56) References Cited

U.S. PATENT DOCUMENTS

| | | | |
|---|---|---|---|
| 5,445,349 | 8/1995 | Hart | 248/118 |
| 5,566,913 | 10/1996 | Prokop | 248/118 |
| 5,692,956 * | 12/1997 | Rifkin | 463/37 |
| 5,731,807 * | 3/1998 | Feierbach | 345/163 |

* cited by examiner

*Primary Examiner*—Steven Saras
*Assistant Examiner*—William C. Spencer
(74) *Attorney, Agent, or Firm*—Steven J. Hultquist

(57) ABSTRACT

A computer mouse having a resilient soft pad with massaging function, comprises a front part and a rear part removably fitted onto said front part. The front part can be separated from the rear part if wish. When the rear and front parts are connected with each other, the power circuit will be in an open status, thus the massaging head projecting from the upper face of the rear part will not vibrate, and then can be used as a resilient soft pad for lessening the fatigue of the user's palm. When the front part is separated from the rear part, the rear part can be used as a massager to massage the body of the user who is fatigued with operating the mouse.

10 Claims, 3 Drawing Sheets

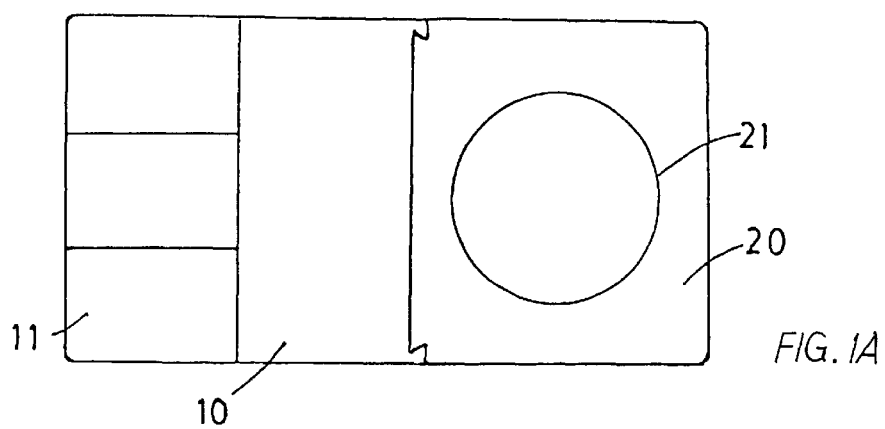
FIG. 1A
FIG. 1B
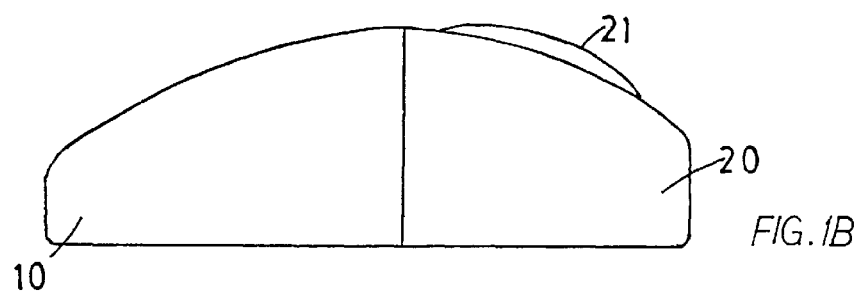
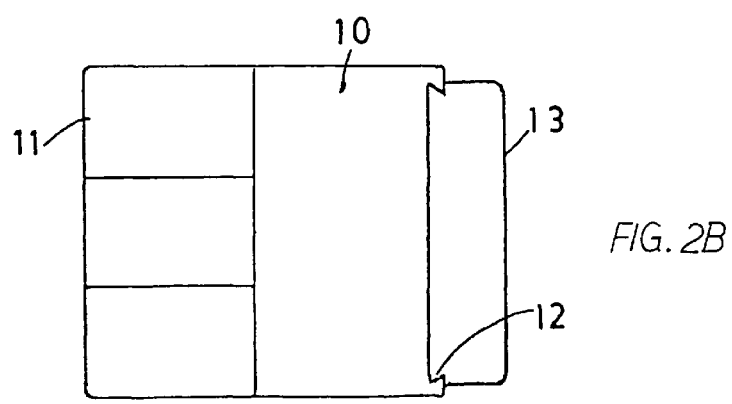
FIG. 2B
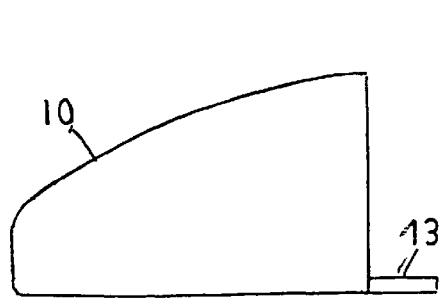
FIG. 2A
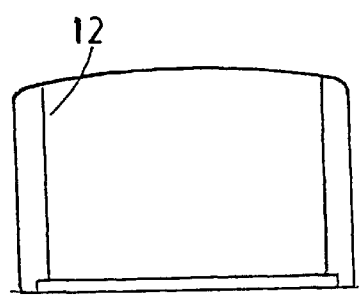
FIG. 2C

COMPUTER MOUSE HAVING A RESILIENT SOFT PAD WITH MASSAGING FUNCTION

FIELD OF THE INVENTION

The present invention relates to a computer mouse, and more particularly, to a computer mouse having a resilient soft pad with massaging function.

DESCRIPTION OF THE PRIOR ART

Computer mouse is a main accessory for a "Windows" computer. Because the shape of the computer mouse looks like a real mouse and can slide on a desk when in use, it is then named as "Mouse". The internal components in the mouse are very simple. In view of the space required for these components, the volume of the space may be much smaller than the volume of an existing mouse. However, for user's conveniently grasping the mouse, the size of the housing of the mouse is designed for being conveniently held by a palm, and thus most of the inside space of the mouse is vacant.

Computer user usually holds the mouse and moves it on the desk all day long, and thus it is inevitable that his arm and palm will be fatigued. If the back portion of the mouse touched by the palm is provided with a resilient soft pad, then it will increase the comfortableness of the palm holding the mouse, and will also lessen the user's fatigue. If said back portion of the mouse can be further used as a massager to massage the fatigued arm, shoulder and back of the user, it should be more desirable.

SUMMARY OF THE INVENTION

This invention is made to meet the aforesaid requirement, and provide a mouse comprising a front part and a rear part which can be freely mounted onto and dismounted from the front part. The front part has all the functions of a computer mouse, and the rear part is a vibration massager. The front and rear parts can be connected together to form a computer mouse, and a resilient massager head provided on the upper end of the massager will serve as a resilient soft pad on the back of the mouse. The rear part can be dismounted from said front part to form a single vibration massager, which can be placed on the desk to massage the palm, and also can be used to massage other portions of the human body. When the rear part is not used, it can be mounted onto the front part at any time to form a part of the mouse.

BRIEF DESCRIPTION OF THE DRAWINGS

These and other attributes of the present invention will become more clear upon a thorough study of the following description of the preferred embodiment for carrying out the invention, particularly when reviewed in conjunction with the drawings, wherein:

FIG. 1A is a top view of the mouse in accordance with the present invention;

FIG. 1B is a front view of the mouse in accordance with the present invention;

FIG. 2A is a front view of the front part of the mouse in accordance with the present invention;

FIG. 2B is a top view of the front part of the mouse in accordance with the present invention;

FIG. 2C is a right side view of the front part of the mouse in accordance with the present invention;

DETAILED DESCRIPTION OF THE INVENTION

Figure 3C:
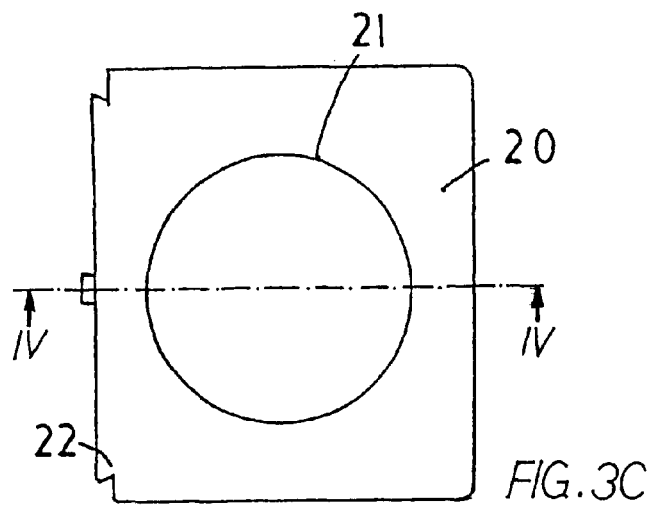
FIG. 3C is a top view of the rear part of the mouse in accordance with the present invention.
Figure 3B:
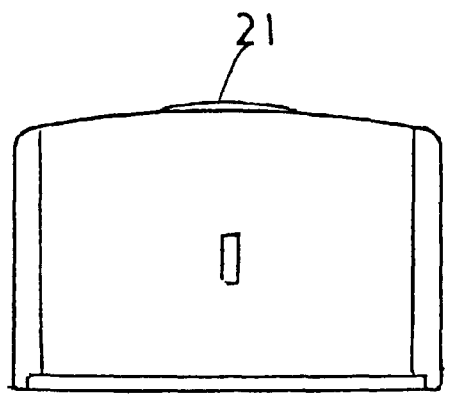
FIG. 3B is a left side view of the rear part of the mouse in accordance with the present invention.
Figure 3A:
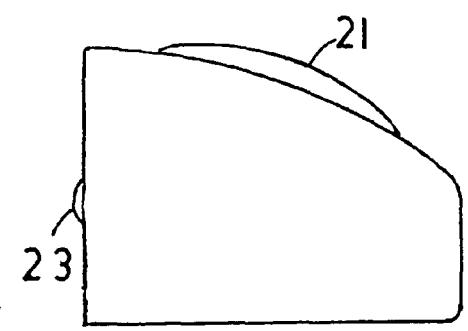
FIG. 3A is a front view of the rear part of the mouse in accordance with the present invention.
Figure 3D:
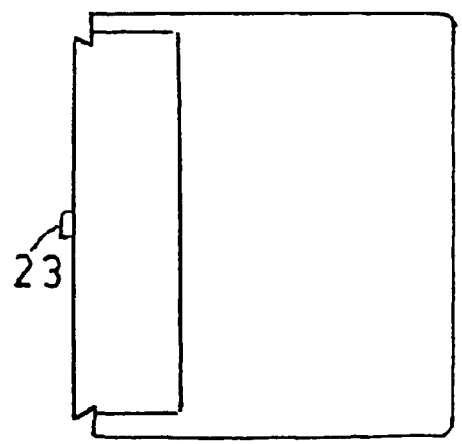
FIG. 3D is a bottom view of the rear part of the mouse in accordance with the present invention.

FIGS. 1A and 1B respectively show a top view and a front view of the mouse in accordance with the present invention. The body of the mouse according to the present invention comprises a front part (10) and a rear part (20) which can be removably fitted onto the front part (10).

The front part (10) has all the functions of an existing computer mouse. As mentioned above, most of the inside space of the existing computer mouse is vacant. According to the present invention, the components of the computer mouse are arranged within the front part (10) without changing the original functions and structure of the assembled components. The detailed technical contents of computer mouse do not belong to the scope of the claims of this invention, and thus the internal structure of the front part (10) will not be specifically described herein.

The rear part (20), upon being connected with the front part (10) (as shown in the drawings), is still a part of the mouse, and a massaging head (21) slightly projecting from the upper face of the rear part (20) is used as a resilient soft pad. When using the mouse, the palm will contact this soft pad and have a feeling of softness due to the resilience of the soft pad, and thus is not liable to be fatigued.

FIGS. 2A, 2B and 2C respectively show a front view, top view and right side view of the front part (10) of the mouse according to the invention. As seen from the drawing, the left end of the front part (10) is provided with three control keys (11), and the two upstanding sides of the right end of the front part (10) are provided with a mounting groove (12), respectively. When connecting the front part (10) with the rear part (20), the mounting surface of the rear part (20) can be inserted into the front part (10) through these mounting grooves (12). A projecting supporting plate (13) is provided at the bottom of the right end of the front part (10), so as to increase the stability of the rear part when connected with the front part.

FIGS. 3A, 3B, 3C and 3D show front, left side, top and bottom views of the rear part (20). The rear part (20), when connected with the front part (10), is a part of the mouse. The massaging head (21) on the upper face of the rear part (20) serves as a resilient soft pad on the back of the mouse. When the rear part (20) is dismounted from the front part (10), it serves as a vibration massager. When pressing the massaging head (21) on the rear part (20), the massaging head will produce slight vibration of high frequency, and provide a massaging effect to the contacted portions of the user's palm.

The two upstanding sides of the left end of the rear part (20) are provided with a mounting groove (22), respectively. When connecting the rear part (20) with the front part (10), the user can insert the mounting grooves (22) into the mounting grooves (12) of the front part (10) to form a whole mouse, as shown in FIGS. 1A and 1B. When fitting the rear part (20) onto the front part (10), a floating button (23) provided in the center of the left side of the rear part (20) will be automatically pressed toward the inside of the rear part (20). Due to the force acting on the round surface, the vibration power is broken off such that the massaging head will not vibrate even if being pressed, and serves as a mere resilient soft pad.

Figure 4:
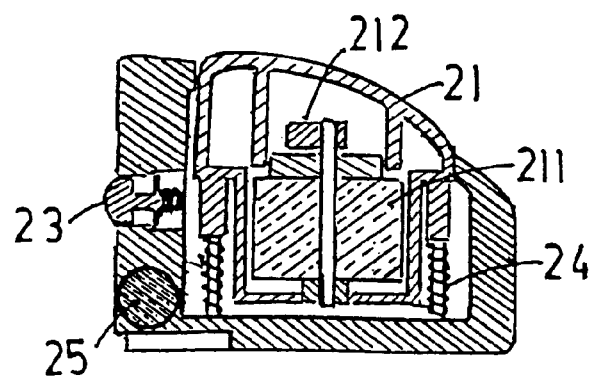
FIG. 4 is a sectional view taken along line IV—IV of FIG. 3C.

FIG. 4 is a sectional view taken along line IV—IV of FIG. 3C. As can be seen from the drawing, the detailed structure of the massaging head (21) is the same as that of a ball-typed vibration massager available in the market except for the shape of the massaging head (21) which is different from that of said conventional ball-typed vibration massager. Since the structure of the massaging head does not belong to the scope of this invention, it will not be specifically described herein.

As can be seen from the drawings, the massaging head (21) is totally independent of the housing of the rear part (20), and is freely mounted onto four or three short posts (24). Springs are provided around such short posts (24), and thus the massaging head (21) can freely and slightly move up and down. A small motor (211) is provided within the massaging head (21), and an eccentric (212) is provided on the motor shaft. When slightly pressing the massaging head (21), the circuit of the dry cells (25) is closed such that the motor shaft will drive the eccentric (212) to rotate at a high frequency, and thus the massaging head (21) can slightly vibrate at a high frequency to produce a massaging function.

Figure 5:
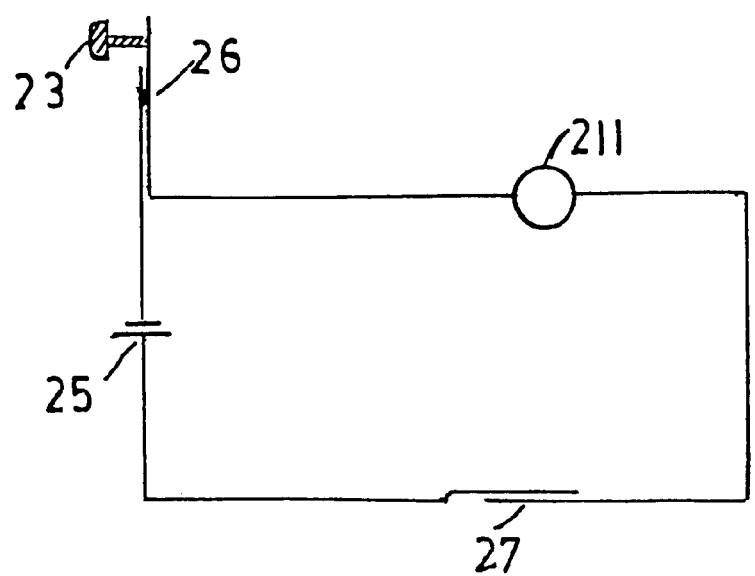
FIG. 5 is a power circuit diagram for a motor used in the mouse in accordance with the present invention.

FIG. 5 shows a power circuit diagram for the motor (211). Said circuit is very simple. The small motor (211), a dry cell (25), a contact (26) and spring-leaf contacts (27) are connected together in series. When slightly pressing the massaging head (21), the spring-leaf contacts (27) will contact with each other and thus the circuit is closed, and the motor (211) can operate. When releasing the pressure on the massaging head (21) (when not massaging), the spring-leaf contacts (27) will be separated from each other, and thus the circuit will be opened. The contact (26) is controlled by the floating button (23). When the rear part (20) is fitted onto the front part (10), the floating button (23) is pressed to urge the contact (26) to separate from the circuit such that the circuit will be in an open status. Hence, no matter whether the spring-leaf contacts (27) contact with each other, the circuit is still in an open status, so that when the rear part (20) is connected with the front part (10) to form a whole mouse, the massaging head (21) is only a resilient soft pad and will not vibrate to affect the operation of the mouse. Upon separating the rear part (20) from the front part (10), the rear part (20) can serves as a single massager.

In one embodiment, the computer mouse and massager feature at least two sets of mated electrodes disposed on the back face of the front part (10) and in corresponding position on the front face of the rear part (20). Such sets of mated electrodes are in electrical contact when the front part (10) and the rear part (20) are coupled. The vibration massager power supply in such embodiment comprises a rechargeable dry cell battery electrically coupled to a recharging circuit powered through said electrodes. In such manner, the dry cell battery is continuously recharged by power from the computer to which the mouse is attached when the front part (10) and the rear part (20) are coupled and the vibration massager is disabled.

As can be seen from the above, it can be known that the mouse of this invention is provided with a resilient soft pad in order to increase the comfortableness of the palm and lessen the fatigue of the palm, and the rear part can be dismounted from the front part at any time to be used a massager to massage the body which is fatigued due to operating the mouse. Therefore, this invention is significantly advantageous to a computer operator.

The present invention is not limited by the forgoing description of the embodiments, the invention may be embodied in other specific forms without departing from the spirit or essential characteristic of the appended claims.

DESCRIPTION OF THE REFERENCE NUMERALS

10 front part
11 control key
12 mounting groove
20 rear part
21 massage head
22 mounting groove
211 small motor

What is claimed is:

1. A computer mouse having a resilient soft pad with massaging function, comprising:
    (a) a front part: and
    (b) a rear part removably fitted onto the front part;
        wherein the rear end of said front part is provided with mounting grooves, and the front end of said rear part is provided with mounting grooves corresponding to the mounting grooves of said front part; and
    a floating button is provided at the center of the left side of said rear part, and a vibration massager is provided in said rear part with a massaging head projecting from the upper face of said rear part, which massaging head is formed as a resilient soft pad when said rear part is connected with said front part, and becomes a single massager upon being separated from said front part.

2. A computer mouse and massager, comprising:
    (a) a front part having a back face, said front part containing conventional mouse features and circuitry;
    (b) a rear part having a front face and an upper and lower surface, removably coupled to the front part whereby the back face of the front part and the front face of the rear part are in proximate spaced relationship when coupled, and having a resilient soft pad disposed in the upper surface of the rear part, said resilient soft pad operatively coupled to a vibration massager disposed, with associated power supply and control circuitry, within the rear part between the upper and lower surface thereof, such that mechanical vibrations from the vibrating massager are transmitted through the resilient soft pad; and
    (c) a depressable button disposed in and protruding from the front face of the rear part, whereby the button is depressed by the back face of the front part when the front part and back part are coupled, and the button is not depressed when the back part is removed from the front part, said depressable button operatively connected to the vibration massager such that functional operation of the vibration massager is disabled when the button is depressed.

3. The computer mouse and massager of claim 2, wherein functional operation of the vibrating massager when the rear part is removed from the front part is initiated and maintained by applying pressure to the resilient soft pad, and functional operation of the vibrating massager is disabled when pressure on the resilient soft pad is released.

4. The computer mouse and massager of claim 3, wherein the vibration massager control circuitry is a closed series electrical circuit, comprising:

(a) the vibration massager power supply;

(b) the vibration massager;

(c) a normally open switch, which is closed with pressure is applied to the resilient soft pad;

(d) a normally closed switch, which is opened by depression of the button in the front face of the rear part when the front part and rear part are coupled.

5. The computer mouse and massager of claim 4, wherein the vibration massager power supply is a dry cell battery.

6. The computer mouse and massager of claim 4, wherein disposed on the back face of the front part and in corresponding position on the front face of the back part are at least two sets of mated electrodes which are in electrical contact when the front part and the back part are coupled, and wherein the vibration massager power supply comprises a rechargeable dry cell battery electrically coupled to a recharging circuit powered through said electrodes, whereby the dry cell battery is continuously recharged by power from the computer to which the mouse is attached when the front part and the back part are coupled and the vibration massager is disabled.

7. A computer mouse and massager, comprising:

(a) a front part containing conventional computer mouse control apparatus;

(b) a rear part having an upper and lower surface, with a resilient soft pad disposed in said upper surface;

(c) a coupling means whereby the front part and rear part are removably coupled;

(d) a vibrating means whereby the resilient soft pad vibrates when depressed, when the rear part is removed from the front part;

(e) a vibration disabling means whereby the resilient soft pad is prevented from vibrating when the rear part is coupled to the front part.

8. The computer mouse and massager of claim 7, wherein the coupling means comprises a vertically oriented conformal channel in one part and a corresponding vertically oriented protruding member of the other part, whereby the protruding member is slideably inserted into the conformal channel in a vertical direction to effect mechanical coupling and resultant structural rigidity between the two parts in all horizontal directions, and the two parts are decoupled by slideably removing the protruding member from the conformal channel in a vertical direction.

9. The computer mouse and massager of claim 7, wherein the vibrating means comprises a vibrating massager electrically coupled to a dry cell battery and associated control circuitry, said vibrating means disposed within the interior of the rear part, between the upper and lower surface thereof, and operatively connected to the resilient soft pad.

10. The computer mouse and massager of claim 7, wherein the vibration disabling means comprises a depressable button deposed within a face of the rear part, said button being depressed by an opposing face of the front part, the two faces being in a proximate spaced relationship when the front part and rear part are coupled, whereby depressing the button disables the vibrating means by interrupting the delivery of electrical power thereto.

\* \* \* \* \*